(12) United States Patent
Stevenson et al.

(10) Patent No.: US 7,318,499 B2
(45) Date of Patent: Jan. 15, 2008

(54) NOISE SUPPRESSION STRUCTURE AND METHOD OF MAKING THE SAME

(75) Inventors: James F. Stevenson, Morristown, NJ (US); Jeff M. Mendoza, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 432 days.

(21) Appl. No.: 10/783,555

(22) Filed: Feb. 20, 2004

(65) Prior Publication Data

US 2005/0183903 A1   Aug. 25, 2005

(51) Int. Cl.
 E04B 1/84 (2006.01)
 E04B 1/99 (2006.01)
 B32B 3/18 (2006.01)
 B32B 5/18 (2006.01)

(52) U.S. Cl. ............... 181/293; 181/284; 181/286; 181/290; 428/156; 428/158

(58) Field of Classification Search ............... 181/284, 181/286, 290, 293; 428/156, 158
See application file for complete search history.

(56) References Cited

U.S. PATENT DOCUMENTS

| 3,919,444 | A | * | 11/1975 | Shayman | ............ | 428/95 |
|---|---|---|---|---|---|---|
| 4,107,107 | A | | 8/1978 | Mendelsohn et al. | | |
| 4,130,175 | A | | 12/1978 | Hehmann | | |
| 4,135,019 | A | | 1/1979 | Kourtides et al. | | |
| 4,176,216 | A | | 11/1979 | Reid et al. | | |
| 4,193,829 | A | | 3/1980 | Kourtides et al. | | |
| 4,235,303 | A | | 11/1980 | Dhoore et al. | | |
| 4,313,524 | A | * | 2/1982 | Rose | ............ | 181/291 |
| 4,431,752 | A | | 2/1984 | Oswitch | | |
| 4,441,578 | A | | 4/1984 | Rose | | |
| 4,444,912 | A | | 4/1984 | Carlson et al. | | |
| 4,461,852 | A | | 7/1984 | Nakamura et al. | | |
| 4,476,254 | A | | 10/1984 | Long et al. | | |
| 4,506,038 | A | | 3/1985 | Gagliani et al. | | |
| 4,518,717 | A | | 5/1985 | Long et al. | | |
| 4,520,141 | A | | 5/1985 | Kumasaka et al. | | |
| 4,621,015 | A | | 11/1986 | Long et al. | | |
| 4,698,370 | A | | 10/1987 | Saeki et al. | | |
| 4,713,400 | A | | 12/1987 | Zwolinski et al. | | |
| 4,900,761 | A | | 2/1990 | Lee et al. | | |
| 4,916,167 | A | | 4/1990 | Chen et al. | | |
| 5,077,318 | A | | 12/1991 | Barringer et al. | | |

(Continued)

FOREIGN PATENT DOCUMENTS

EP   1 174 261 A1   1/2002

(Continued)

Primary Examiner—Lincoln Donovan
Assistant Examiner—Jeremy Luks
(74) Attorney, Agent, or Firm—Ingrassia Fisher & Lorenz

(57) ABSTRACT

An integrated noise suppression acoustic panel includes a back plate, a face plate, and a bulk foam absorber disposed between the back plate and the face plate. The bulk foam absorber is formed of a thermoset material, such as bismaleimide or phenolic, and is manufactured using a low pressure process. In particular, a foamable material is melted, and a blowing agent is mixed with the foamable material to obtain a mixture. The foam is formed and the mixture is cured by heating it to a temperature, and maintaining the mixture at the temperature for a time sufficient to cure the mixture.

10 Claims, 4 Drawing Sheets

U.S. PATENT DOCUMENTS

| | | |
|---|---|---|
| 5,122,546 A | 6/1992 | Lee |
| 5,135,073 A * | 8/1992 | Nelson ................. 181/290 |
| 5,137,931 A | 8/1992 | Okumura et al. |
| 5,298,531 A | 3/1994 | Ishikura et al. |
| 5,380,768 A | 1/1995 | Cranston et al. |
| 5,414,232 A | 5/1995 | Wilson |
| 5,686,501 A | 11/1997 | Triolo |
| 5,744,763 A | 4/1998 | Iwasa et al. |
| 5,754,491 A * | 5/1998 | Cushman ..................... 367/1 |
| 5,800,888 A * | 9/1998 | Yasumoto et al. ...... 428/36.91 |
| 5,852,064 A | 12/1998 | Lamartine et al. |
| 5,929,395 A * | 7/1999 | Bizlewicz ................. 181/207 |
| 5,945,643 A * | 8/1999 | Casser ..................... 181/290 |
| 5,994,418 A | 11/1999 | Weiser et al. |
| 6,014,414 A | 1/2000 | Yamamoto et al. |
| 6,133,330 A | 10/2000 | Weiser et al. |
| 6,133,332 A | 10/2000 | Ide et al. |
| 6,179,086 B1 | 1/2001 | Bansemir et al. |
| 6,476,090 B1 | 11/2002 | Arito et al. |
| 6,601,673 B2 * | 8/2003 | Murakami et al. .......... 181/293 |
| 6,638,990 B2 * | 10/2003 | Haas et al. ................. 521/174 |
| 2005/0126848 A1 * | 6/2005 | Siavoshai et al. ............ 181/207 |
| 2005/0181196 A1 * | 8/2005 | Aylward et al. ......... 428/304.4 |

FOREIGN PATENT DOCUMENTS

| | | |
|---|---|---|
| WO | WO 92/13339 | 8/1992 |

* cited by examiner

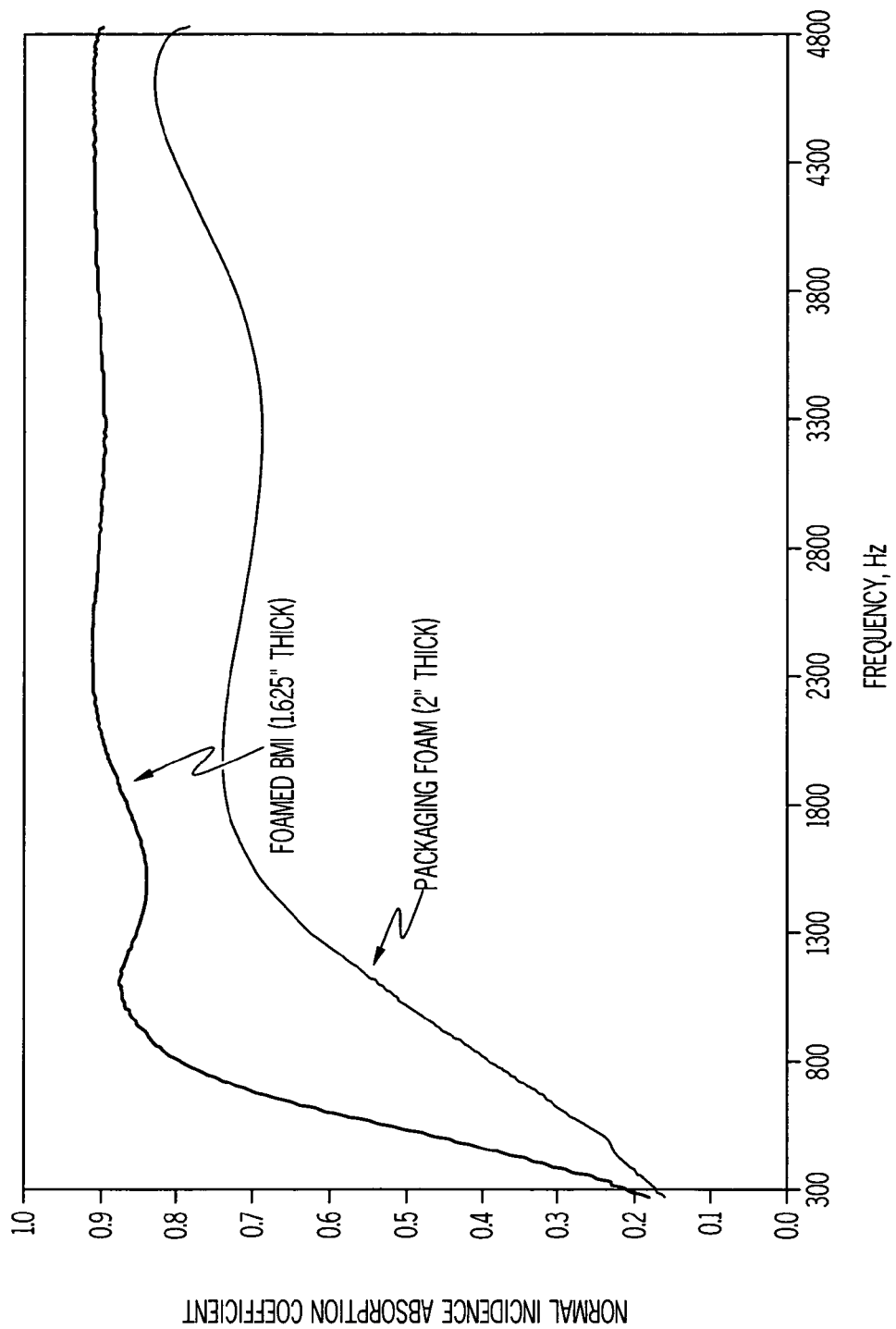

NOISE SUPPRESSION STRUCTURE AND METHOD OF MAKING THE SAME

FIELD OF THE INVENTION

The present invention relates to noise suppression structures and, more particularly, to noise suppression structures for aircraft ducts and plenums, and methods of making the structures.

BACKGROUND OF THE INVENTION

Many aircraft are powered by jet engines. In most instances, jet engines include one or more gas-powered turbine engines, auxiliary power units (APUs), and/or environmental control systems (ECSs), which can generate both thrust to propel the aircraft and electrical energy to power systems installed in the aircraft. Although most aircraft engines are generally safe, reliable, and efficient, the engines do exhibit certain drawbacks. For example, the turbine engines, as well as other components that make up the engine, can be sources of unwanted noise, especially during aircraft take-off and landing operations. Moreover, APUs and ECSs can be sources of unwanted ramp noise. Thus, various governmental rules and regulations aimed at mitigating such noise sources have been enacted.

To address, and at least somewhat alleviate, the unwanted noise emanating from aircraft noise sources, and to thereby comply with the above-noted rules and regulations, various types of noise reduction treatments have been developed. For example, one type of noise reduction treatment that has been developed for use in aircraft ducts is a noise suppression panel. In many instances, noise suppression panels are flat or contoured, and include a honeycomb structure disposed between a backing plate and a face plate. Other noise suppression materials and structure may also be disposed between the backing plate and face plate. The noise suppression panels are typically placed on the interior surface of engine or APU inlet and/or outlet plenums, as necessary, to reduce noise emanations.

Although the above-described noise suppression panels do exhibit fairly good noise suppression characteristics, the panels also exhibit certain drawbacks. For example, the honeycomb structure can be costly to manufacture, and difficult to conform to contoured surfaces. The honeycomb structure can also be difficult to bond to the backing plated and/or face plate. Moreover, the honeycomb structure used in these panels is typically uniform in size and shape, which can result in the noise suppression panel being highly effective over only a relatively narrow frequency range.

Hence, there is a need for a noise suppression panel that is less costly to manufacture as compared to known panels, and/or can be readily conformed to contoured surfaces, and/or can be readily bonded to backing and/or face plates, and/or is effective over a relatively wide frequency range. The present invention addresses one or more of these needs.

SUMMARY OF THE INVENTION

The present invention provides a noise suppression panel that can be readily conformed to contoured surfaces, can be readily bonded to backing and/or face plates, and is effective over a relatively wide frequency range. In addition, the noise suppression panel can be manufactured using a method that is easier and less costly, as compared to known panels manufacturing methods.

In one embodiment, and by way of example only, an integrated noise suppression acoustic panel includes a back plate, a face plate, and a bulk foam absorber. The bulk foam absorber is disposed between the back plate and the face plate, and comprises a thermoset material.

In another exemplary embodiment, a method of forming an open cell foam bulk absorber includes mixing a predetermined amount of a blowing agent with a predetermined amount of a foamable material to obtain a mixture thereof. The mixture is heated to at least a predetermined cure temperature at which the blowing agent will decompose. The mixture is then maintained at the predetermined cure temperature for a predetermined cure time.

Other independent features and advantages of the preferred noise suppression panel and method will become apparent from the following detailed description, taken in conjunction with the accompanying drawings which illustrate, by way of example, the principles of the invention.

BRIEF DESCRIPTION OF THE DRAWINGS

FIG. 5 is a graph that compares the normal incidence acoustic absorption versus frequency for a foam bulk absorber made of polyurethane (packaging foam sample) and a foam bulk absorber made in accordance with an embodiment of the present invention.

DETAILED DESCRIPTION OF A PREFERRED EMBODIMENT

Before proceeding with the detailed description, it is to be appreciated that the described embodiment is not limited to use in conjunction with a particular type of engine, or in a particular type of vehicle. Thus, although the present embodiment is, for convenience of explanation, described as being implemented in an aircraft environment, it will be appreciated that it can be implemented in various other types of vehicles, and in various other systems and environments.

Figure 1:
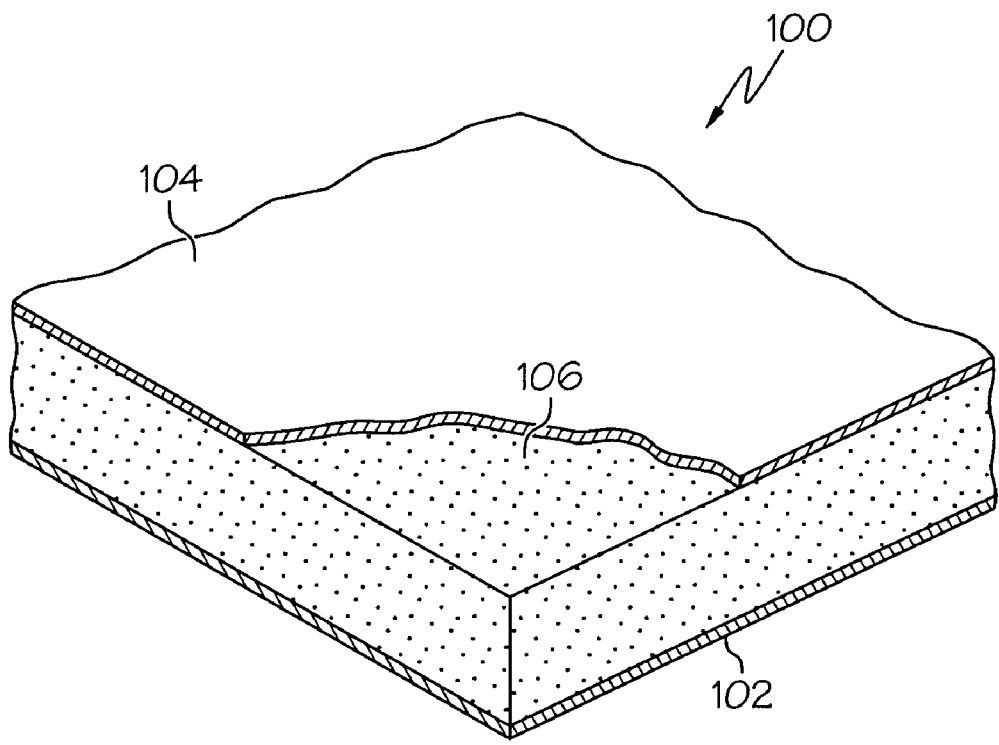
FIG. 1 is a simplified perspective view of a noise suppression panel according to an exemplary embodiment of the present invention.
Figure 2:
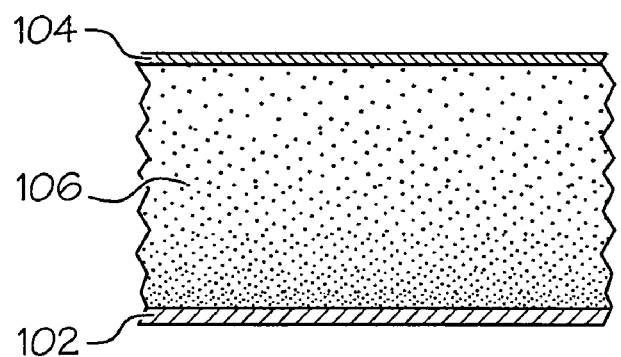
FIG. 2 is a cross section side view of the exemplary noise suppression panel shown in FIG. 1.
Figure 3A:
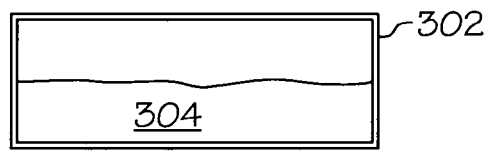
FIGS. 3A-3E are simplified schematic representations of an exemplary process for making the noise suppression panel of FIGS. 1 and 2, according to one embodiment of the present invention.
Figure 3B:
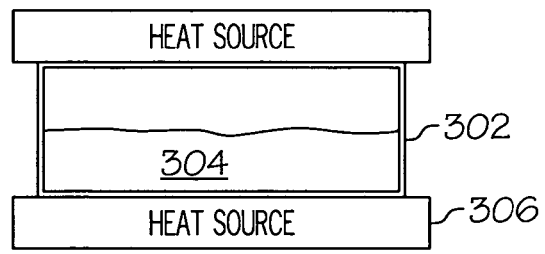
Figure 3C:
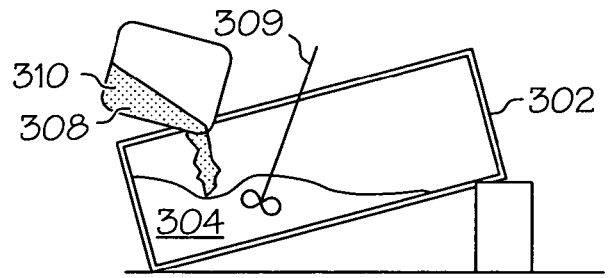
Figure 3D:
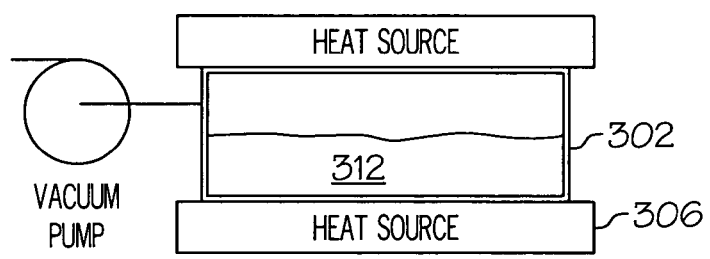
Figure 3E:
Figure 4:
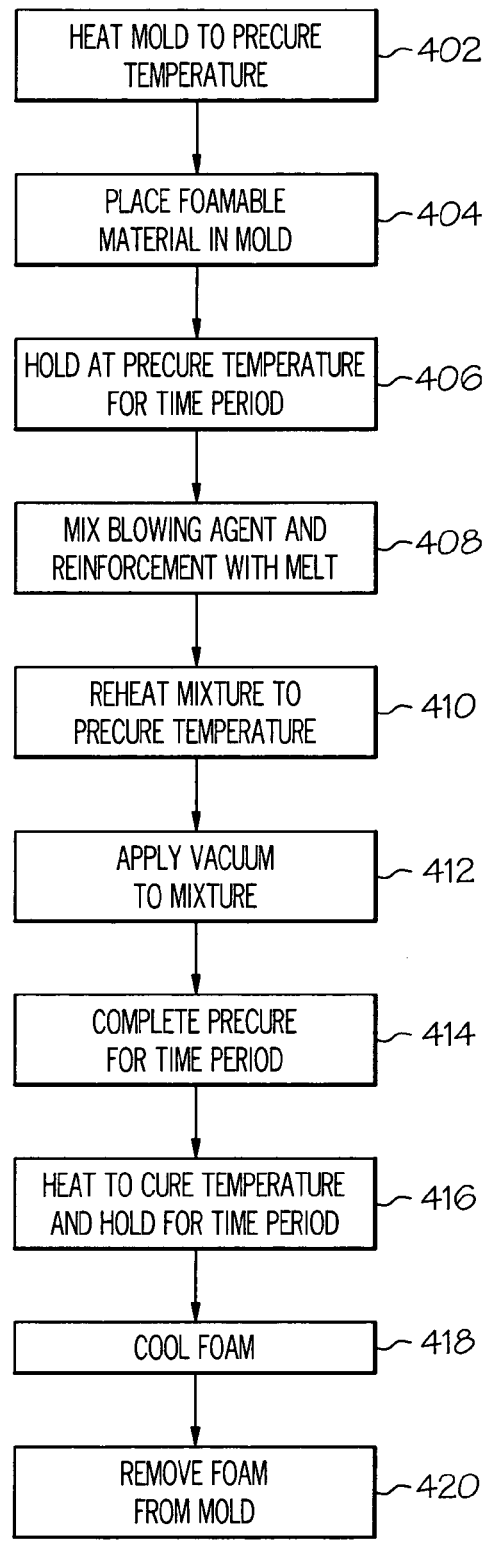
FIG. 4 is a diagram depicting the process steps illustrated in FIGS. 3A-3E in a sequential, flowchart form.

Turning now to the description, and with reference first to FIGS. 1 and 2, an exemplary noise suppression panel 100 is depicted in perspective and cross section, respectively. The panel 100 includes a back plate 102, a face plate 104, and a bulk foam absorber 106. The back plate 102 is preferably imperforate and is constructed of any one of numerous types of non-porous materials such as, for example, aluminum. In a particular preferred embodiment, however, the back plate 102 is constructed of bismaleimide (BMI). As will be described more fully below, the back plate 102 is preferably bonded directly to the bulk foam absorber 106 during manufacture of the panel 100.

The face plate 104 is constructed of any one of numerous types of materials such as, for example, aluminum, and carbon composites. In a particular preferred embodiment, however, the face plate 104 is constructed of BMI, and is perforated to a desired percent open area (POA) value. As is generally known, relatively low POA values (e.g., ~5%)

acoustic resistance, whereas relatively high POA values (e.g., ~30%) provide acoustic transparency. In a particular preferred embodiment, the face plate 104 is perforated to a POA value greater than 30% to ensure the face plate 104 is acoustically transparent to any incident sound. Similar to the back plate 102, and as will be described further below, the face plate 104 is also preferably bonded to the bulk foam absorber 106 during manufacture of the panel 100.

The bulk foam absorber 106 is disposed between the back plate 102 and face plate 104 and, as was mentioned above, is preferably directly bonded to each plate 102, 104 during manufacture of the panel 100. The bulk foam absorber 106, following fabrication, is preferably an open cell foam bulk absorber. Thus, it is preferably constructed of a foamable material. Some non-limiting examples of these materials include various thermoset materials, such as bismaleimide (BMI), phenolics, epoxies, or polyimides, various ceramic powder compounds, such as alumina or zirconia, and various metal powder compounds, such as 316L stainless steel, or carbonyl iron and nickel compounds. The thermoset materials are preferably used for relatively low temperature applications (e.g., 200-400° F.), and the ceramic or metal powder compounds are preferably used for relatively high temperature applications (e.g., 1200-1500° F.). Moreover, when the ceramic or metal powder compounds are used, a binder may additionally be included. Non-limiting examples of such binders include agar gels, polystyrene, or other polymer/wax combinations.

With reference now to FIG. 2, it is seen that in the depicted embodiment the bulk foam absorber 106 has a density gradient between the back plate 102 and face plate 104. In particular, the density of the bulk foam absorber 106 decreases from the interface with the back plate 102 to the interface with the face plate 104. Moreover, the manufacturing process, various embodiments of which are described in more detail below, creates open cells having a distribution of sizes about a mean size. This distribution of cell sizes results in an increased frequency range over which the bulk foam absorber 106 is effective. It will be appreciated that the bulk foam absorber 106 can be manufactured without the density gradient between the back plate 102 and face plate 104. However, including this density gradient further increases the effective frequency range of the bulk foam absorber 106.

The bulk foam absorber 106 in the integrated noise suppression panel 100 described above is manufactured by mixing a blowing agent, which is a material that decomposes at or above a specific decomposition temperature and gives off a gas, within a melted foamable material in a mold. The temperature of the mixture may first be raised to a pre-cure temperature for a period of time sufficient for the viscosity of the mixture to become high enough to retain gas bubbles that are formed during decomposition of the blowing agent. Whether or not it is first raised to the pre-cure temperature, the temperature of the mixture is raised to at least the decomposition temperature of the blowing agent, and is held at this temperature for a time sufficient to cure, and form the bulk foam absorber 106. Upon completion of the cure time, and any post-cure, the bulk foam absorber 106 is removed from the mold, may be cut as desired, and is ready to use. As will be described below, the back plate and face plate 104 may be adhered to the bulk foam absorber 106 after it is manufactured, or each may be integrally bonded to the bulk foam absorber 106 during its manufacture.

Various equipment arrangements and specific processes may be used to implement the general manufacturing process described above. With reference to FIGS. 3A-3E and FIG. 4, one particular exemplary equipment arrangement, and the specific preferred process associated with using this equipment arrangement, will now be described. In the following description, it should be understood that the parenthetical reference numerals generally correspond to process steps and associated reference numerals depicted in FIG. 4

The bulk foam absorber 106 described above is preferably formed by preheating a mold 302 to a predetermined pre-cure temperature (402), and a foamable material 304 is then placed in the preheated mold 302 (404). The pre-cure temperature may vary, depending on the type of foamable material 304 that is used. In a particular preferred embodiment, in which the foamable material 304 is a thermoset material, such as bismaleimide (BMI), the pre-cure temperature is about 150° C. It will be appreciated that other thermoset materials may be used as the foamable material 304, such as, for example, phenolics, or polyimides, and that non-thermoset materials, such as, for example, metals or ceramic powders with thermoplastic binders may also be used. If needed, an appropriate solution, such as Frekote 700NC, is applied to the interior surfaces of the mold 302 before the mold 302 is preheated and the foamable material 304 is placed into the mold 302. The solution substantially inhibits the bulk foam absorber 106 from sticking to the mold 302, upon completion of the process. It will be appreciated that the mold 302 may be heated using any one of numerous heat sources 306. For example, the mold 302 may be placed on a press, or its contents may be heated using microwaves. It will additionally be appreciated that the mold 302, which is depicted in FIGS. 3A-3E as being rectangular in shape for ease of illustration, could be shaped in any one of numerous shapes. For example, the mold 302, or portions thereof, could be curved, so that a noise suppression panel 100 having curved surfaces matching curved regions in the inlet of a jet engine could be formed. No matter the specific manner in which the mold 302 is heated, or the specific shape of the mold 302, once the foamable material 304 is added to the mold 302, it is held at the pre-cure temperature for a sufficient time to melt the foamable material 304 (406). In a particular preferred embodiment, in which the foamable material is BMI, this melt time is about 30 minutes.

Upon completion of the melt time, the mold 302 is removed from the heat source 306, and a blowing agent 308 is mixed into the melted foamable material 304 (408). Preferably, the mold 302 is tilted to accumulate the melted foamable material 304 along one edge of the mold 302 prior to adding the blowing agent 308. In any case, during or after blowing agent addition, a driven stirrer 309 such as, for example, a paint stirrer driven by a drill, is used to mix the blowing agent 308 and melted foamable material 304 together. The type of blowing agent 308, and the amount of blowing agent 308 added to the melted foamable material 304, may vary depending on the particular type of foamable material 304 and blowing agents 308 used. In a particular preferred embodiment, in which BMI is the foamable material 304, the blowing agent 308 is Safoam® RPC, a blowing agent powder available from Reedy International Corporation, of Keyport, N.J., and is added in an amount that is about 3-10% of the foamable material weight, and preferably about 5% of the foamable material weight. It will be appreciated that the blowing agent 308 need not be a powder, which decomposes to form a gas, but may instead be a liquid that forms gas via vaporization at its boiling point, which is analogous to the decomposition temperature for a powder. Non-limiting examples of liquid blowing agents include, water, hexyl alcohol, or butyl alcohol. It will additionally be appreciated that if water is used it may either be a by-product of a condensation reaction or added during formulation.

In addition to adding the blowing agent 308 to the melted foamable material 304, a reinforcement material 310 may also be added (408). The reinforcement material 310 provides added structural strength to the bulk foam absorber 106. The reinforcement material 310, and the amount added to the melted foamable material 304 may vary. In a particular preferred embodiment, the reinforcement material 310 is a synthetic polymer fiber, such as Kevlar® pulp, manufactured by DuPont, in an amount of about 0.25-3.0% of the foamable material weight, with about 0.5% of being preferred. In an alternate embodiment, the reinforcement material 310 is a powdered carbon fiber, such as Thornel T-300®, manufactured by BP Amoco Chemicals, in an amount of about 0.5-3.0% of foamable material weight, with about 1.0% being preferred. It is noted that when Kevlar pulp is used as the reinforcement material 310, considerable more mixing may be required than if powdered carbon fiber is used. However, while the powdered carbon fiber may be easier to mix, it tends to settle, so additional mixing may be necessary in subsequent steps. It will be appreciated that in addition to adding the reinforcement material 310, other compounding ingredients such as, for example, lubricants, viscosity adjusting agents, nucleating agents, surface active agents, and/or foam stabilizers and the like may also be added to the melted foamable material 304.

After the blowing agent 308, the reinforcement material 310, and any other desired agents have been added to, and adequately mixed with, the melted foamable material 304 to form a mixture 312, the mold 302 is sealed and once again and exposed to the heat source 306. The heat source 306 reheats the mold 302 back to the pre-cure temperature (e.g., 150° C. for BMI). The mold 302 is held at the pre-cure temperature for a predetermined reheat time period (410), which may vary depending on the foamable material 304, blowing agent 308, and amount of cooling during the mixing. In a particular preferred embodiment, in which BMI and Safoam® RPC are the foamable material 304 and blowing agent 308, respectively, the predetermined reheat time period is about 20 minutes.

In the depicted embodiment, during the reheat time period, or shortly before or shortly thereafter, a vacuum is drawn within the interior of the mold 302 using, for example, a vacuum pump 314(412). Subjecting the mixture 312 to a vacuum pressure removes any air that may have been introduced during the mixing step. In a particular preferred embodiment, the vacuum is cyclically applied and removed a predetermined number of times. The magnitude and number of cycles may vary. In a particular preferred embodiment, a vacuum of about 25-27 inches of Hg is drawn on the mold 302 for about 2 minutes, with a return to ambient pressure for about 1 minute. This cycle is preferably repeated about 3 to 4 times.

Following the reheat time period and the vacuum pressure cycles described above, the mixture 312 is pre-cured, by holding it at the pre-cure temperature (e.g., 150° C.) for a predetermined amount of time (414). This pre-cure time may vary, and is selected to ensure the viscosity of the mixture 312 becomes high enough to retain gas bubbles that are formed when the blowing agent 308 decomposes. In a particular preferred embodiment, in which BMI and Safoam® RPC are the foamable material 304 and blowing agent 308, respectively, the predetermined total pre-cure time is about 150 minutes.

Once the pre-cure time period is complete, the mixture 312 is cured by raising its temperature to a predetermined cure temperature, preferably over a predetermined time period (416). During this time period, the blowing agent 308 decomposes (or vaporizes) and the foamable material 304 cures. As the blowing agent 308 decomposes (or vaporizes), open cells are formed in the curing foamable material 304, thereby forming the bulk foam absorber 106. Again, the predetermined temperature and predetermined time period may vary, depending on the foamable material 304 and blowing agent 308 used, and is preferably at least the decomposition temperature of the blowing agent 308. In a particular preferred embodiment, in which BMI and Safoam® RPC are the foamable material 304 and blowing agent 308, respectively, the temperature of the mixture 312 is first raised to 210° C. over approximately 25 minutes, and is then lowered to 200° C. and held at this temperature for about 65 minutes. It will be appreciated that the time-temperature profile for a particular combination of foamable material 304 and blowing agent 308 is developed to give the proper balance between gas formation and viscosity increase of the foamable material 304, which allows the gas that is formed to be trapped. It will additionally be appreciated that the time-temperature profile is developed so that the bulk foam absorber 106 will preferably have the distribution of open cell sizes, average density, and the density gradient, previously described.

Following the cure time, the bulk foam absorber 106 is allowed to cool (418). Thereafter, it is removed from the mold 302 (420). One or both of the back plate 102 and face plate may then be bonded to the bulk foam absorber 106 using any one of numerous types of adhesives such as, for example, epoxy resin. Moreover, before or after the back plate 102 and/or face plate 104 are bonded to the bulk foam absorber 106, the bulk foam absorber 106 may be machined, to obtain flat surfaces, and may be cut to a specified size. In addition, one or more of the outer surfaces of the bulk foam absorber 106 may be sandblasted to facilitate opening of cells on the outer surfaces.

In some instances, it may be desired to alter various properties of the bulk foam absorber 106, such as toughness and/or the glass transition temperature. In such instances, the cured bulk foam absorber 106 may be subject to a second cure (or post-cure) at a post-cure temperature, which is higher than the cure temperature, for a predetermined post-cure time.

Although the process described above indicates that back 102 and face 104 plates are bonded to the bulk foam absorber 106 following manufacture of the bulk foam absorber 106, it will be appreciated that this is merely exemplary of one method of adhering one or both of these plates 102, 104 to the bulk foam absorber 106. In an alternative embodiment, the back plate 102 and/or face plate 104 may be bonded to the bulk foam absorber 106 during its manufacture. For example, the back plate 102 and/or face plate 104 may be inserted into the mold 302 at some point prior to the curing process.

In addition, although the blowing agent 308 and reinforcement material 310 were described above as being mixed into the melted foamable material 304, it will be appreciated that this is merely exemplary of one particular embodiment. In an alternative embodiment, the foamable material 304, blowing agent 308, and reinforcement material 310 are mixed to form a dry mixture, which is then heated to the pre-cure temperature. With this alternative process, application of the vacuum pressure may be omitted, since no air is added during the mixture. In yet another alternative embodiment, the foamable material 304, blowing agent 308, and reinforcement material 310 are mixed in a heated mixer, either as a melt or a dry blend mixture 312. The melted mixture 312 is then metered into one or more molds 302 for curing.

The bulk foam absorber 106 described herein provides broadband absorption, as compared to presently known materials. For example, FIG. 5 depicts a graph of normal incidence acoustic absorption versus frequency for two foam bulk absorbers. One of the absorbers is made of 2.0-inch thick polyurethane foam (packaging foam sample), which is generally acknowledged in the art as being a good standard for broadband noise comparison purposes. The other absorber is made of 1.625-inch thick BMI foam, in accordance with the above described methodology. As may be readily seen, the BMI foam absorber provides improved absorption at each frequency, as compared to the polyurethane foam absorber sample.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An integrated noise suppression acoustic panel, comprising:

a back plate;

a face plate; and a bulk foam absorber disposed between the back plate and the face plate, the bulk foam absorber comprising a thermoset material and having a density gradient between the first side and second side, wherein the density of the bulk foam absorber at the first side is greater than the density of the bulk foam absorber at the second side.

2. The panel of claim 1, further comprising:

a plurality of open cells formed in the bulk foam absorber.

3. The panel of claim 1, wherein the bulk foam absorber includes at least a first side that is at least partially coupled to the back plate and a second side that is at least partially coupled to the face plate.

4. The panel of claim 1, wherein the thermoset material is at least one of bismaleimide, a phenolic, an epoxy, or a polyimide.

5. The panel of claim 1, wherein:

the back plate is substantially imperforate; and the face plate is at least partially perforated.

6. The panel of claim 1, wherein the bulk foam absorber further comprises a blowing agent.

7. The panel of claim 1, wherein the blowing agent is at least one of a solid powder or a liquid.

8. The panel of claim 1, wherein the foam bulk absorber further comprises a reinforcement material.

9. The panel of claim 8, wherein the reinforcement material comprises a synthetic polymer fiber.

10. The panel of claim 8, wherein the reinforcement material comprises a powdered carbon fiber.

* * * * *